United States Patent
Bagnasco et al.

(10) Patent No.: US 11,156,177 B2
(45) Date of Patent: Oct. 26, 2021

(54) METHODS AND SYSTEMS FOR CATALYST MONITORING ENABLEMENT

(71) Applicant: Ford Global Technologies, LLC, Dearborn, MI (US)

(72) Inventors: Andrew Paul Bagnasco, Plymouth, MI (US); Mario Anthony Santillo, Canton, MI (US); Paul Raymond Willette, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 16/593,880

(22) Filed: Oct. 4, 2019

(65) Prior Publication Data

US 2021/0102507 A1 Apr. 8, 2021

(51) Int. Cl.
| | | |
|---|---|---|
| *F02D 41/02* | (2006.01) | |
| *F01N 3/10* | (2006.01) | |
| *F01N 11/00* | (2006.01) | |
| *F02D 41/14* | (2006.01) | |
| *F02D 41/38* | (2006.01) | |

(52) U.S. Cl.
CPC ......... *F02D 41/0235* (2013.01); *F01N 3/101* (2013.01); *F01N 11/002* (2013.01); *F01N 11/007* (2013.01); *F02D 41/1441* (2013.01); *F02D 41/1458* (2013.01); *F02D 41/38* (2013.01); *F01N 2550/02* (2013.01); *F02D 2200/0802* (2013.01)

(58) Field of Classification Search
CPC .. F01N 11/002; F01N 11/007; F01N 2550/02; F01N 3/101; F02D 2200/0802; F02D 2200/0814; F02D 41/0235; F02D 41/1441; F02D 41/1454; F02D 41/1458; F02D 41/38
See application file for complete search history.

(56) References Cited

U.S. PATENT DOCUMENTS

| | | | | |
|---|---|---|---|---|
| 5,077,970 A | * | 1/1992 | Hamburg | F01N 11/007 60/274 |
| 5,099,647 A | * | 3/1992 | Hamburg | F01N 11/007 60/274 |
| 5,119,628 A | * | 6/1992 | Uema | F01N 11/007 60/274 |
| 5,159,810 A | * | 11/1992 | Grutter | F01N 11/007 60/274 |
| 5,228,335 A | | 7/1993 | Clemmens et al. | |
| 5,272,872 A | * | 12/1993 | Grutter | F01N 11/007 60/274 |
| 5,289,678 A | * | 3/1994 | Grutter | F01N 11/007 60/277 |
| 6,233,923 B1 | * | 5/2001 | Itou | F01N 13/009 60/277 |
| 6,470,674 B1 | * | 10/2002 | Yamaguchi | F01N 11/007 60/277 |

(Continued)

*Primary Examiner* — Jesse S Bogue
(74) *Attorney, Agent, or Firm* — Geoffrey Brumbaugh; McCoy Russell LLP

(57) ABSTRACT

Methods and systems are provided for enabling diagnostics of an exhaust catalyst regardless of a level of oxygen stored in the catalyst. In one example, a method may include initiating diagnostics of the catalyst in response to an oxygen sensor coupled downstream of the catalyst recording a measurement that crosses a stoichiometric air-fuel ratio output more than a threshold number of times.

20 Claims, 6 Drawing Sheets

(56) References Cited

U.S. PATENT DOCUMENTS

| | | | |
|---|---|---|---|
| 6,879,906 B2 | 4/2005 | Makki et al. | |
| 6,922,985 B2 * | 8/2005 | Wang | F02D 41/1479 |
| | | | 60/277 |
| 8,205,435 B2 * | 6/2012 | Iida | F01N 11/007 |
| | | | 60/277 |
| 9,359,967 B2 | 6/2016 | Santillo et al. | |
| 2003/0221415 A1 * | 12/2003 | Rosel | F02D 41/1495 |
| | | | 60/277 |
| 2004/0098967 A1 * | 5/2004 | Cook | F02D 41/1454 |
| | | | 60/274 |

* cited by examiner

METHODS AND SYSTEMS FOR CATALYST MONITORING ENABLEMENT

FIELD

The present description relates generally to methods and systems for enabling diagnostics of an exhaust catalyst regardless of a level of oxygen stored in the catalyst.

BACKGROUND/SUMMARY

A vehicle may include a three-way catalyst (TWC) for treating exhaust gases of an internal combustion engine. Feedback control may be applied to regulate an engine's air-fuel ratio (AFR) so that engine exhaust constituents may be adjusted in a way that improves catalyst efficiency. Vehicles may include a universal exhaust gas oxygen (UEGO) sensor positioned upstream of the TWC and a heated exhaust gas oxygen (HEGO) sensor positioned downstream of the TWC to control the AFR near stoichiometry. The UEGO sensor provides feedback to adjust engine out gases about stoichiometry. The HEGO sensor provides feedback to bias the engine air-fuel ratio richer or leaner to improve catalyst efficiency.

Three-way catalysts contain ceria compounds that both store and release oxygen molecules to act as a buffer against generating undesirable tailpipe emissions during short lean and rich excursions from stoichiometry. As the catalyst ages, however, the ceria compounds begin to deactivate, lowering the total oxygen-storage capacity of the catalyst, thereby decreasing the effect of the catalyst in reducing tailpipe emissions.

Precise engine air-fuel ratio control may improve catalyst conversion efficiency; however, if the catalyst is in a degraded state, vehicle emissions may be above regulated levels even if the engine air-fuel ratio is precisely controlled. Therefore, it may be desirable to determine whether or not a catalyst is degraded so that remedial measures may be taken to reduce unwanted emissions or to alert the driver to take the vehicle to a dealership for servicing.

Various approaches are provided for carrying out a diagnostic routine for an exhaust catalyst based on inputs from one or more exhaust oxygen sensors. In one example, as shown in U.S. Pat. No. 9,359,967, Santillo et al. teaches carrying out exhaust catalyst diagnostics during closed loop convergence conditions when a HEGO sensor output is near stoichiometry. Other approaches to judge whether or not a catalyst is degraded is to make a one-time change to the engine's air-fuel ratio from lean to rich or vise-versa and measure the time it takes to observe a corresponding change in exhaust gas oxygen concentration downstream of a catalyst. The time it takes to observe a change in oxygen concentration may provide an indication as to a level of catalyst degradation.

However, the inventors herein have recognized potential issues with such systems. As one example, the closed loop convergence condition may not be satisfied at all oxygen storage levels. As an example, if the catalyst has no stored oxygen (also referred to as "empty can"), the HEGO sensor reading may deviate from near stoichiometry. During conditions when the closed loop convergence is not absent, catalyst diagnostics may be disabled to account for a control system error which may also be manifested by a lack of convergence of the closed loop. However, by disabling catalyst diagnostics during empty can conditions, a rate of completion of catalyst diagnostics may reduce. In order to effectively and efficiently monitor a health of a catalyst, it is desired to enable catalyst diagnostics at all levels of oxygen storage. For diagnostics routines that intrusively change an engine's air-fuel ratio to conduct the diagnostics, engine exhaust emissions may be degraded if rich or lean exhaust gases break through the catalyst due to such changes in the engine's air-fuel ratio. Further, opportunities to monitor a step change may be limited and noise in the system may make the estimated results based on only a few observations less certain.

In one example, the issues described above may be addressed by a method for an engine, comprising: monitoring health of a catalyst coupled to an exhaust passage based on inputs from an oxygen sensor coupled downstream of the catalyst upon fulfilment of diagnostic entry conditions including the oxygen sensor recording a stoichiometric air-fuel ratio higher than a threshold number of times. In this way, by enabling catalyst diagnostics based on a number of times a stoichiometric air-fuel ratio is recorded by the oxygen sensor (e.g., the HEGO sensor), the catalyst diagnostics may be carried out at all levels of oxygen storage.

As one example, a catalyst diagnostic routine may be carried out based on comparison between outputs of a first oxygen sensor coupled to an exhaust passage upstream of the catalyst (such as a UEGO sensor) and a second oxygen sensor coupled to the exhaust passage downstream of the catalyst (such as a HEGO sensor) upon enabling conditions for the diagnostic routine being met. As an example, air-fuel ratios upstream and downstream of the catalyst may be manipulated to determine a transfer function gain of the catalyst. The transfer function gain may be a basis for indicating the presence or absence of catalyst degradation. The enabling conditions for the diagnostic routine may include an air-fuel ratio control system converged to stoichiometry as indicated by a number of times a stoichiometric air-fuel ratio recorded by the HEGO sensor within a pre-determined duration is higher than a threshold. Alternatively, a rate of stoichiometric crossing by the downstream oxygen sensor may be estimated, and the catalyst diagnostic routine may be enabled if the rate of stoichiometric crossing is higher than a threshold rate. Additional conditions for enabling the catalyst diagnostic routine may include a desired temperature range, engine load, and speed conditions.

In this way, the catalyst diagnostic routine may be enabled even if an instantaneous reading of the downstream oxygen sensor deviates from near stoichiometry. Therefore, catalyst diagnostics are not disabled at any level of oxygen storage in the catalyst. The technical effect of enabling catalyst diagnostics based on a number of times a stoichiometric air-fuel ratio is recorded by the HEGO sensor is that the catalyst diagnostics may be carried out more frequently. By increasing the frequency of catalyst diagnostics, degradation of catalysts may be promptly detected and associated mitigating actions may be carried out. Overall, by efficiently monitoring the health of an exhaust catalyst, emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
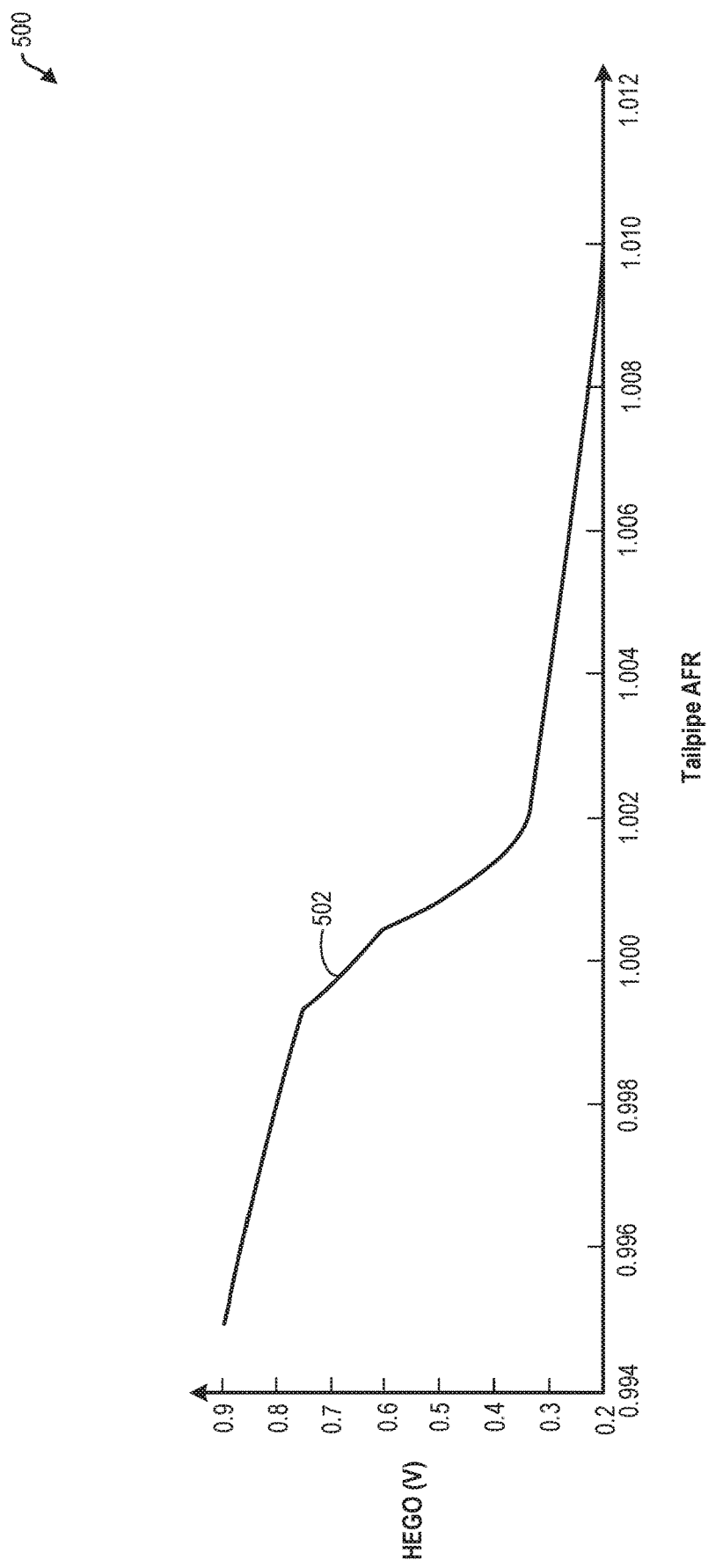
FIG. 5 shows an example plot of variation in voltage output of an oxygen sensor coupled to the exhaust passage downstream of the exhaust catalyst.
Figure 6:
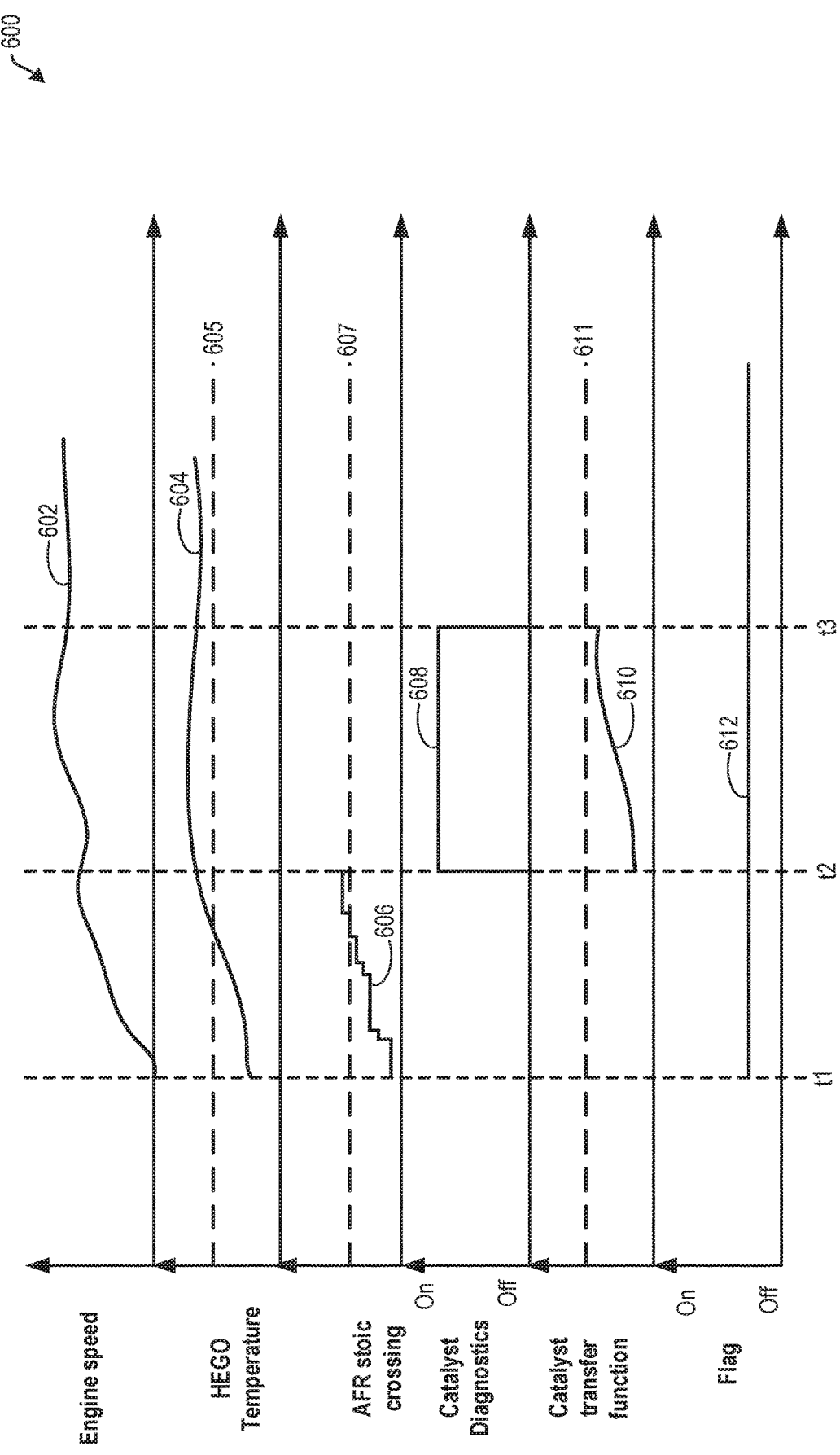
FIG. 6 shows an example enablement and diagnostics of the exhaust catalyst.

The following description relates to systems and methods for enabling diagnostics of an exhaust catalyst regardless of a level of oxygen stored in the catalyst. The systems and methods may be implemented in a vehicle, such as a hybrid vehicle, that includes an engine such as the engine system depicted in FIG. 1. The engine system may include an air-fuel control system as is shown in FIG. 2. An engine controller may be configured to perform control routines, such as the example routine of FIG. 3 to enable a diagnostic routine of the exhaust catalyst and the example routine of FIG. 4 to carry out the diagnostic routine of the exhaust catalyst. FIG. 5 shows an example plot of variation in voltage output of an oxygen sensor coupled to the exhaust passage downstream of the exhaust catalyst. An example enablement and diagnostics of the exhaust catalyst is shown in FIG. 6.

Figure 1:
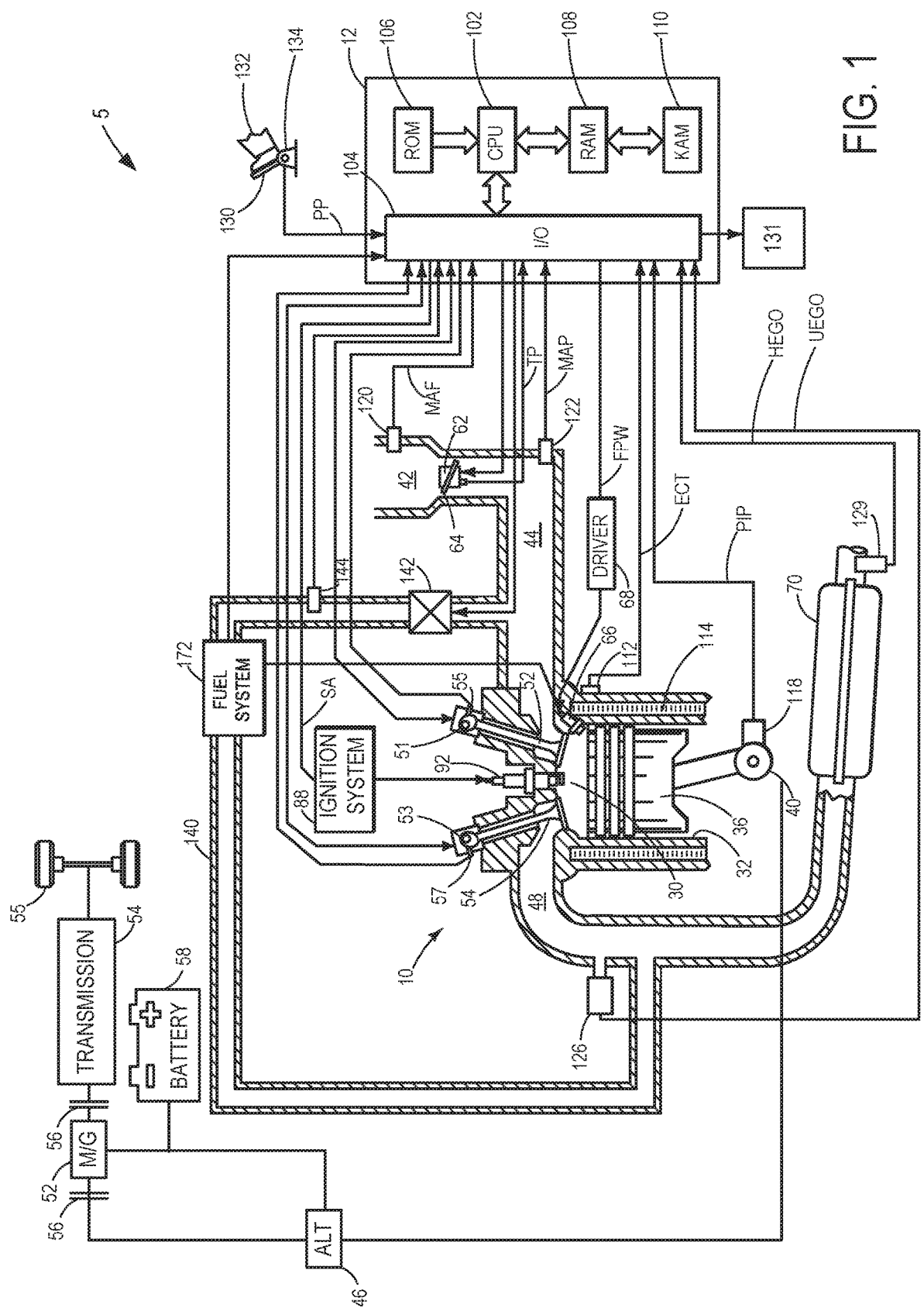
FIG. 1 shows a schematic depiction of an example engine system including an exhaust catalyst.
Figure 2:
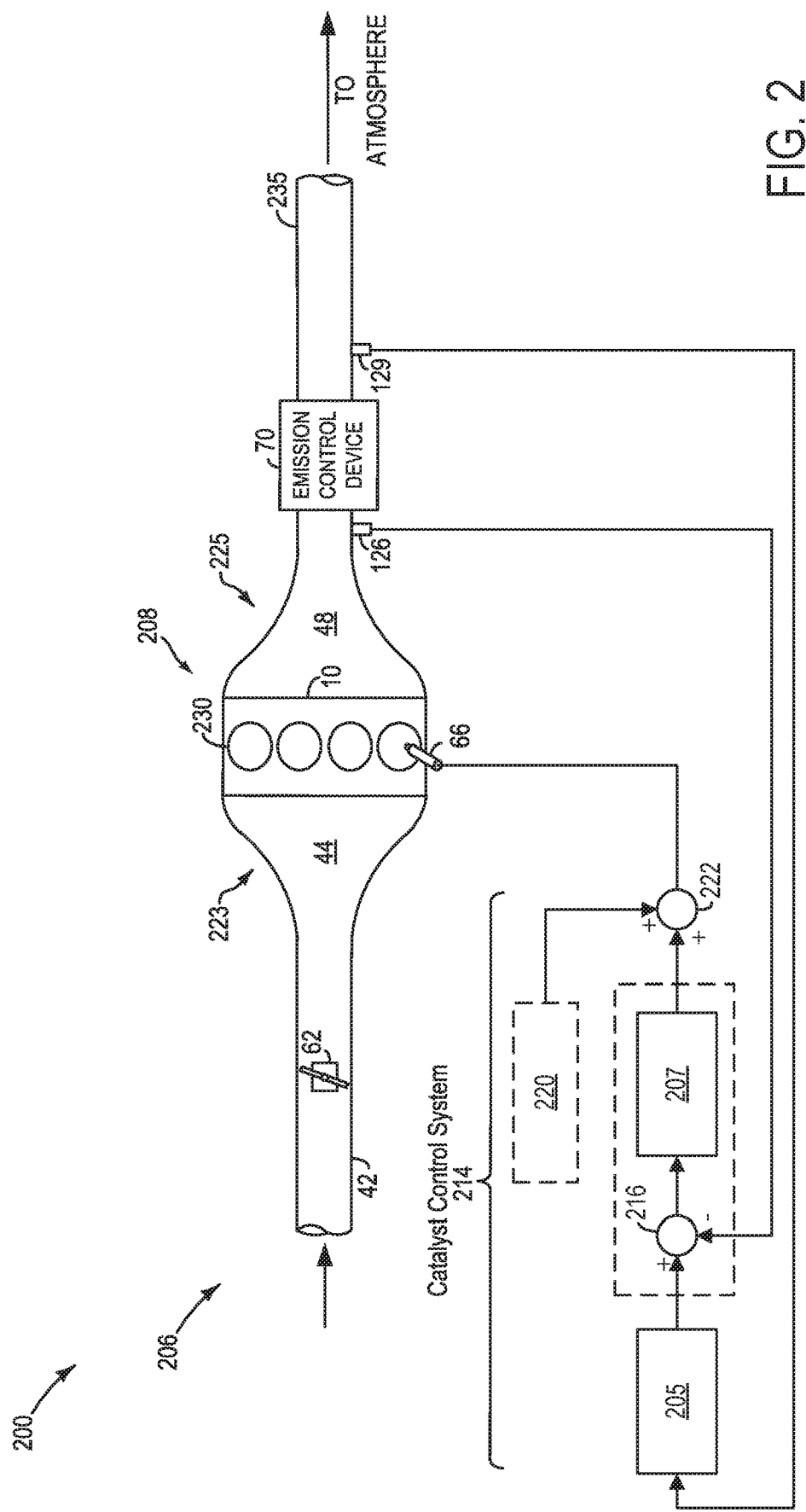
FIG. 2 shows a schematic illustration of an example catalyst control system.

FIG. 1 illustrates a schematic diagram showing one cylinder of multi-cylinder engine 10, which may be included in a propulsion system of a vehicle 5. Engine 10 may be controlled at least partially by a control system including controller 12 and by input from a vehicle operator 132 via an input device 130. In this example, input device 130 is an accelerator pedal and it includes a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may engage crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative examples, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some examples, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate example, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some examples, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one example, upstream exhaust gas sensor 126 is a UEGO configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three-way catalyst (TWC), configured to reduce NOx and oxidize CO and unburnt hydrocarbons. In some examples, device 70 may be a NOx trap, a dedicated oxygen-storage catalyst, various other emission control devices, or combinations thereof.

A second, downstream exhaust gas sensor 129 is shown coupled to exhaust passage 48 downstream of emissions control device 70. Downstream sensor 129 may be any suitable sensor for providing an indication of exhaust gas air-fuel ratio such as a UEGO, EGO, HEGO, etc. In one example, downstream sensor 129 is a HEGO configured to indicate the relative enrichment or leanness of the exhaust gas after passing through the catalyst. As such, the HEGO may provide output in the form of a switch point, or the voltage signal at the point at which the exhaust gas switches from lean to rich.

Diagnostics of the emission control device 70 may be carried out upon entry conditions being met. The entry conditions may include downstream sensor 129 recording a stoichiometric air-fuel ratio higher than a threshold number of times within a threshold duration. The diagnostics entry conditions further include a rate of stoichiometric crossing of the downstream sensor 129 being higher than a threshold rate, wherein the stoichiometric crossing corresponds to the downstream sensor 129 recording the stoichiometric air-fuel ratio such as an output voltage of 0.45V. The diagnostics entry conditions further include the output voltage of the downstream sensor 129 being within a threshold range. Diagnostics of the emission control device 70 include indicating a degradation of the emission control device 70 in response to a catalyst transfer function determined within a specified frequency range based on an output of the downstream sensor 129. The degradation may be based on a gain of the catalyst transfer function within the specified frequency range being above a threshold. In response to indication of degradation, engine fuel injectors may be adjusted to reduce an amplitude of a square wave air-fuel ratio provided to the emission control device 70.

Further, in the disclosed examples, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

In some examples, controller 12 may output an indication of system degradation to a light or display panel 131. The indication may be a visual alert such as an illuminated light or a message. The message may include a diagnostic code that indicates the nature of the degraded condition. For example, controller 12 may indicate a degraded catalyst via light or display panel 131. The indication may be an alpha-numeric code representing catalyst or other component degradation.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 30.

In some examples, vehicle 5 may be a hybrid vehicle, such as a plug-in hybrid electric vehicle (PHEV), with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 40 of engine 10 and electric machine 52 are connected via transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 40 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

FIG. 2 shows a schematic illustration of inner and outer feedback control loops for a catalyst control architecture 200. Catalyst control architecture 200 includes an engine system 206 and a catalyst control system 214, where the engine 10 includes an exhaust system 225.

The engine system 208 may include an engine 10 having a plurality of cylinders 230. The engine 10 includes an engine intake 42 and an engine exhaust 48. The engine intake 42 includes a throttle 62 in fluidic communication with engine intake manifold 44. The engine exhaust system 225 includes an exhaust manifold 48 leading to an exhaust passage 235 that routes exhaust gas to the atmosphere. The engine exhaust system 225 may include one or more emission control devices 70, which may be mounted in a close-coupled position in the exhaust. One or more emission control devices may include a three-way catalyst, lean NOx trap, particulate filter, oxidation catalyst, dedicated oxygen-storage catalyst, etc. It will be appreciated that other components may be included in the engine such as a variety of valves and sensors, as depicted, for example, in FIG. 1.

The vehicle system 206 may further include a catalyst control system 214. Catalyst control system 214 is shown receiving information from exhaust gas oxygen sensors 126 and 129 and sending control signals to fuel injectors 66. As one example, exhaust gas oxygen sensors may include exhaust gas sensor 126 located upstream of the emission control device 70, and exhaust gas sensor 129 located downstream of the emission control device 70. Other sensors such as pressure, temperature, air-fuel ratio, and composition sensors may be coupled to various locations in the vehicle system 206. The catalyst control system 214 may receive input data from the various sensors, process the input data, and apply the actuators in response to the processed input data based on instructions or code programmed therein corresponding to one or more routines. Catalyst control system 214 may be configured with instructions stored in non-transitory memory that cause catalyst control system 214 to perform control routines via one or more actuators based on information received via one or more sensors. Example control routines to enable and carry out diagnostics of the emissions control device 70 (also referred herein as catalyst) are described herein with reference to FIGS. 3 and 4.

In one example, emission control device 70 is a three-way catalyst, exhaust gas sensor 126 is a UEGO sensor, and exhaust gas sensor 129 is a HEGO sensor.

Catalyst control system 214 regulates the air-to-fuel ratio (AFR) to a desired air-fuel ratio near stoichiometry and fine-tunes this regulation based on the deviation of a HEGO voltage from a pre-determined HEGO-voltage set point. Inner-loop controller 207 uses the upstream UEGO sensor 126 for higher-bandwidth feedback control while outer-loop controller 205 uses the HEGO sensor 129 for lower-bandwidth control. Catalyst control system 214 may be implemented by an engine controller, such as controller 12.

Inner-loop controller 207 may comprise a proportional-integral-derivative (PID) controller that regulates the engine AFR by generating an appropriate fuel command (e.g., fuel pulse width). Summing junction 222 combines the fuel command from inner-loop controller 207 with commands from feed-forward controller 220. This combined set of commands is delivered to the fuel injectors 66 of engine 10. UEGO sensor 126 provides a feedback signal to the inner-loop controller 207, the UEGO feedback signal proportional to the oxygen content of the feedgas or engine exhaust between the engine 10 and TWC 70. Outer-loop controller 205 generates a UEGO reference signal (e.g., a desired air-fuel ratio) provided to the inner-loop controller 207. The UEGO reference signal is combined with the UEGO feedback signal at junction 216. The error or difference signal provided by junction 216 is then used by inner-loop controller 207 to adjust the fuel command so that the actual AFR within engine 10 approaches the desired AFR. HEGO sensor 129 provides feedback to the outer loop controller 205. The HEGO feedback signal may be used to adjust the UEGO reference signal, or air-fuel ratio reference signal, provided to inner-loop controller 207 via junction 216. Additionally, outer loop controller 205 works to improve catalyst efficiency by imposing a low amplitude air-fuel ratio square wave at the catalyst input. The square wave allows exhaust gas constituents entering the catalyst to vary so as to replenish oxygen and CO in the catalyst, thereby improving hydrocarbon oxidation and NOx reduction.

In this way, the system of FIGS. 1 and 2 provides for a system, comprising: a controller with computer readable instruction stored on non-transitory memory that, when executed, cause the controller to: estimate a voltage output of an exhaust gas sensor coupled to an exhaust passage downstream of a three-way catalyst over a time duration; estimate a number of times the voltage output crosses a value representing the stoichiometric air-fuel ratio over the time duration; and in response to the number of time being higher than threshold number, independent of a current output of the exhaust gas sensor, carrying out diagnostics of the three-way catalyst. The diagnostics of the three-way catalyst is carried out after a light-off temperature of the catalyst being reached and upon activation on of each of an inner air-fuel ratio control loop and an outer air-fuel ratio control loop.

Figure 3:
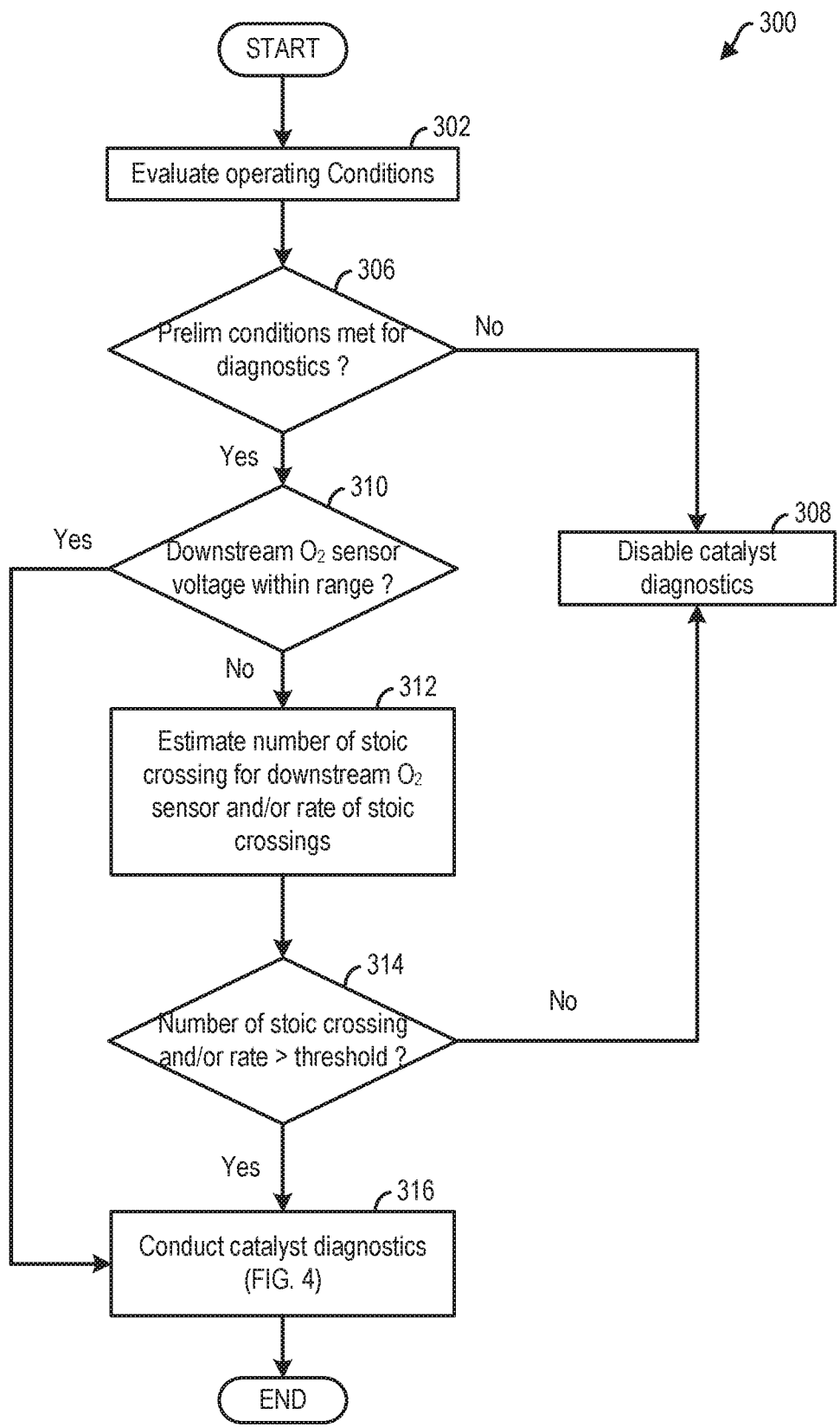
FIG. 3 shows a flow chart illustrating an example method which may be implemented to enable a diagnostic routine of the exhaust catalyst.

FIG. 3 shows an example method 300 to enable a diagnostic routine of the exhaust catalyst. The exhaust catalyst (such as emissions control device 70) may be coupled to an engine exhaust passage. The exhaust catalyst may be a three-way catalysts operating through oxidation and reduction reactions to convert hydrocarbons (HC), carbon monoxide (CO), and oxides of nitrogen (NOx) present in the exhaust gas into H2O, CO2, and N2. Three-way catalysts contain ceria compounds that both store and release oxygen molecules to act as a buffer against generating undesired tailpipe emissions during short lean and rich deviations from stoichiometry. The oxygen storage level in the catalyst may vary over time.

Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine temperature, engine load, engine air-fuel ratio (AFR), UEGO sensor (such as UEGO sensor 126 in FIG. 2) voltage, HEGO sensor (such as HEGO sensor 129 in FIG. 2) voltage, ambient conditions (such as ambient humidity, temperature, and barometric pressure), exhaust temperature, manifold pressure, manifold air flow, battery state of charge, etc.

At 306, the routine includes determining if preliminary conditions are met for carrying out a diagnostics routine for the exhaust catalyst. The preliminary conditions may include activation of the outer air-fuel ratio control loop. In one example, the outer air-fuel control ratio may be activated after the engine's inner air-fuel ratio control loop has activated and controlling to a desired air-fuel ratio near stoichiometry, after the rear HEGO sensor reaches a threshold temperature, and in response to a threshold amount of time since engine start. In this way, method 300 may avoid enabling catalyst diagnostics if the vehicle is operating in a fuel cut-out mode, cold start, or other condition where post catalyst air-fuel ratio may not be reliable for catalyst transfer function determination. The preliminary conditions may further include a higher than threshold catalyst temperature, wherein the catalyst temperature may be the light-off temperature of the catalyst. Also, to fulfil the preliminary conditions for carrying out a diagnostics routine, an engine speed, engine load, and engine air flow rate are within a specified operating range.

If it is determined that the preliminary conditions are not met for carrying out a diagnostics routine for the exhaust catalyst, at 308, catalyst diagnostics may be deactivated since the UEGO and/or HEGO output may not be reliable under the present engine conditions.

If it is determined that the preliminary conditions are not met for carrying out a diagnostics routine for the exhaust catalyst, at 310, the routine includes determining if the oxygen sensor downstream of the of the catalyst (such as the HEGO sensor) output is within a desired range. The desired voltage range may be around stoichiometry corresponding to a HEGO sensor output of about 0.45 V. In one example, the desired voltage range may be between 0.35 V and 0.85 V. The HEGO output may be in this voltage range (around stoichiometry) during conditions when the catalyst retains at least a minimum level of oxygen storage. However, during conditions when the catalyst has no stored oxygen (empty can), the HEGO sensor reading may deviate from near stoichiometry. As an example, the HEGO sensor output may oscillate above and below the desired range at the same frequency as a square-wave input signal.

If it is determined that the HEGO sensor output is not in the desired range, at 312, a number of stoichiometric crossings for the oxygen sensor downstream of the catalyst (such as the HEGO sensor) over a threshold duration and/or a rate of stoichiometric crossings may be estimated. A stoichiometric crossing may be defined as the HEGO sensor which is a switching type sensor recording a stoichiometric AFR such as recording an output voltage of about 0.45 V (such as within 5%). The threshold duration may be a threshold duration of time, vehicle travel, or integrated engine flow, for example. The threshold duration may be pre-calibrated based on engine operating conditions to determine convergence of the catalyst control system to stoichiometry. In one example, the threshold duration may be one minute.

In order to estimate the rate of stoichiometric crossings, the number of times stoichiometry is crossed is estimated over a specified time duration and a rate of stoichiometric crossings may be estimated. The specified time duration may be pre-calibrated based on engine operating conditions to determine convergence of the catalyst control system to stoichiometry. In one example, the specified duration may be several seconds.

In one example, the rate of stoichiometric crossings for the oxygen sensor downstream of the catalyst may be compared to a rate of stoichiometric crossings for the oxygen sensor upstream of the catalyst (such as the UEGO sensor). A stoichiometric crossing for the UEGO sensor may be defined as the UEGO sensor recording a stoichiometric AFR. The rate estimations for the stoichiometric crossings may be carried out for both the UEGO sensor and the HEGO for the same specified duration.

FIG. 5 shows an example plot 500 of voltage output of an oxygen sensor, such as the HEGO sensor 129 of FIG. 2, coupled to the exhaust passage downstream of the exhaust catalyst. The x-axis denotes tailpipe air-fuel ratio and the y-axis denotes voltage output of the HEGO sensor. The voltage output of the HEGO sensor is shown by line 502. As shown, in a HEGO sensor, the voltage switches from high to low as the tailpipe AFR changes from rich to lean. Each change from rich to lean across stoichiometry (e.g., tailpipe AFR equals 1) may be termed as crossing stoichiometry.

Returning to FIG. 3, at 314, the routine includes determining if the number of stoichiometric crossings over the specified time period is higher than a threshold number and/or a rate of stoichiometric crossings is higher than a threshold rate. The threshold number and the threshold rate may be pre-calibrated based on HEGO sensor output during empty can conditions after the catalyst control system has converged to stoichiometry. In one example, a threshold number of stoichiometric crossing may be five.

In one example, the routine may include determining if the rate of stoichiometric crossings for the HEGO sensor is substantially equal (such as within 5% difference) to the rate of stoichiometric crossings for the UEGO sensor.

If it is determined that the CMS sensor output is outside of the desired closed loop range, and one of the number of stoichiometric crossings over the specified time period is lower than the threshold number, a rate of stoichiometric crossings is lower than the threshold rate, and the rate of stoichiometric crossings for the HEGO sensor is substantially less than the rate of stoichiometric crossings for the UEGO sensor, it may be inferred that the catalyst control system has not converged to stoichiometry and at 308, catalyst diagnostic routine may be disabled If it is determined that the number of stoichiometric crossings over the specified time period is higher than the threshold number, a rate of stoichiometric crossings is higher than the threshold rate, and/or the rate of stoichiometric crossings for the HEGO sensor is substantially equal to the rate of stoichiometric crossings for the UEGO sensor, it may be inferred that the catalyst control system has converged to stoichiometry even if the HEGO voltage output deviates from the desired range due to conditions such as an empty can. Since it is determined that catalyst control system has converged to stoichiometry, at 316, catalyst diagnostics may be carried out. Also, if at 310, it is determined that the HEGO sensor output is within the desired range, the routine may directly proceed to step 316. In this way, convergence to stoichiometry of the control system may be determined for different oxygen storage conditions of the catalyst. Details of an example catalyst diagnostics routine is discussed in FIG. 4.

In this way, in response to an output of a downstream exhaust gas sensor coupled downstream of an exhaust catalyst being outside a threshold range, a number of stoichiometric crossings of the output of the downstream exhaust gas sensor may be estimated within a threshold duration, and a diagnostics of the exhaust catalyst may be conducted in response to the number of stoichiometric crossings being higher than a threshold.

Figure 4:
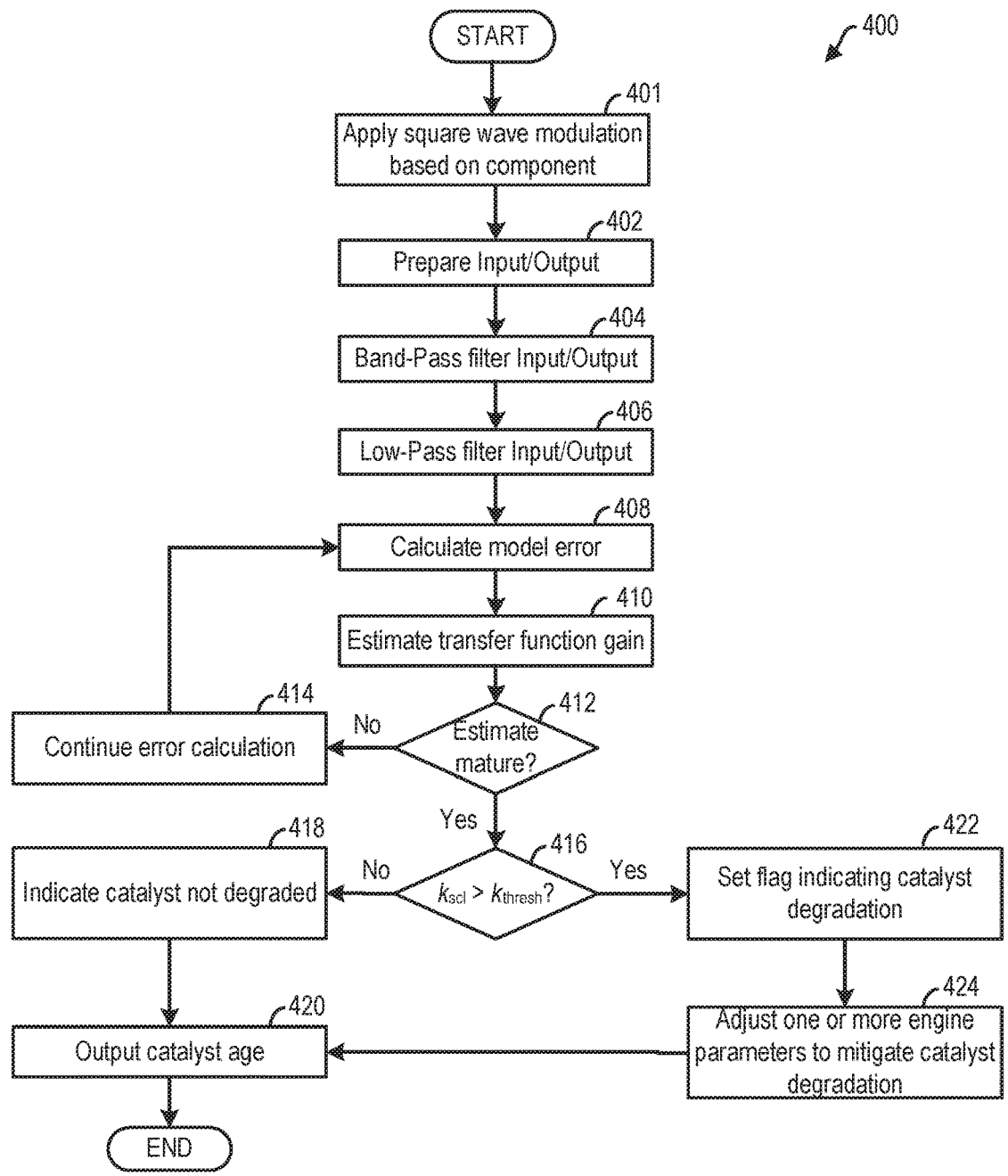
FIG. 4 shows a flow chart illustrating an example method which may be implemented to identify a degraded exhaust catalyst.

FIG. 4 shows an example method 400 that can be implemented to identify a degraded exhaust catalyst. Upon enablement of a diagnostics routine for an exhaust catalyst, the controller may employ a method such as method 400 or any other diagnostic routine that rely on comparison of an output of an oxygen sensor (such as UEGO sensor 126 in FIG. 2) coupled to the exhaust passage upstream of the catalyst and an output of an oxygen sensor (such as HEGO sensor 129 in FIG. 2) coupled to the exhaust passage downstream of the catalyst.

At 402, method 400 applies an air-fuel modulation to the engine air-fuel ratio. The amplitude of the modulation is centered about stoichiometry or a small bias may be applied. The air-fuel modulation frequency may be based on the volume and location of the catalyst for which the transfer function is being estimated or other factors such as engine speed and load. In one example, the frequency may be 1.5 Hz.

At 402, method 400 prepares the monitored catalyst's input and output for processing. In particular, the output voltage of the upstream UEGO is converted into an air-fuel ratio. Likewise, the HEGO sensor output is converted into an air-fuel ratio. The voltage output from the sensors is representative of an oxygen concentration in the exhausts. The voltages are converted into air-fuel ratios via passing the voltages through transfer functions having air-fuel ratio as output.

Additionally, the tail pipe air-fuel ratio as estimated from the HEGO sensor output is operated on by a high pass filter with an adjustable time constant t, (e.g., a typical safeguard against signal noise introduced near the sampling frequency) to estimate the derivative of the output. The catalyst air-fuel ratio input determined from the UEGO is converted into a modeled output of the subject catalyst.

At 404, the derivative of the measured downstream or post catalyst air-fuel ratio $\dot{y}_f$ and the derivative of the modeled downstream air-fuel ratio $\dot{y}_{m,f}$ are band-passed filtered. At 406, a low-pass or moving average filter is applied to the band-pass filtered versions of the derivative of the measured downstream or post catalyst air-fuel ratio and the band-pass filtered version of the derivative of the modeled downstream air-fuel ratio. The low pass filter is applied so that the input/output phasing does not affect the estimation result of the catalyst's transfer function gain.

At 408, a model error ε is determined as a function of a catalyst transfer function gain magnitude estimate that is given a starting value (e.g., 1), which the algorithm adjusts as the method iterates after each program loop.

At 410 an updated catalyst transfer function gain magnitude may be estimated. The method 400 may apply an integrator and a calibrated (e.g. adjustable) gain to update the catalyst transfer function gain magnitude.

At 412, the routine includes determining if the estimation of the updated catalyst transfer function gain magnitude has met a maturity metric. In one example, the maturity metric is an amount of time that has been exceeded (e.g., ten minutes). In other examples, the maturity metric may be a distance traveled by the vehicle. More sophisticated methods that evaluate engine variables in terms of persistent change are yet another effective way to evaluate maturity. If it is determined that the maturity metric has not been met, at 414, estimation of the model error may be continued and the routine may move to step 408.

If it is determined that the estimation of the updated catalyst transfer function gain magnitude has met the maturity metric, at 416, the routine includes determining if the estimated catalyst transfer function gain magnitude ($K_{scl}$) is greater than a non-zero threshold magnitude ($K_{thresh}$). If it is determined that the catalyst transfer function gain magnitude ($K_{scl}$) is lower than the threshold magnitude ($K_{thresh}$), at 418, it may be indicated that the catalyst is not degraded. At 420, an estimated catalyst age in response to the estimated catalyst transfer function gain magnitude may be estimated. In one example, a table or function of empirically determined catalyst age values are indexed using the estimated catalyst transfer function gain magnitude and the catalyst age is output.

If it is determined that the estimated catalyst transfer function gain magnitude ($K_{scl}$) is greater than the threshold magnitude ($K_{thresh}$), at 422, a flag (diagnostic code) may be set indicating catalyst degradation. In response to detection of degradation, at 424, one or more engine parameters may be adjusted adjusts actuators to at least partly mitigate the effects of catalyst degradation. In one example, the engine fuel injectors may be adjusted so as to reduce the amplitude of the square wave air-fuel ratio provided to the catalyst being diagnosed for possible degradation. A higher amplitude square wave may be desirable when the catalyst is operating as desired since it may require additional gases to penetrate and refresh catalyst reaction cites near the downstream side of the catalyst because the front reaction cites are operating efficiently. However, if the catalyst is degraded, a square wave of the same amplitude may result in lean or rich breakthrough. Therefore, the square wave amplitude may be reduced via adjusting fuel injector on time.

The routine may then proceed to step 420, wherein the catalyst age may be estimated based on the estimated catalyst transfer function gain magnitude.

FIG. 6 shows an example timeline 600 illustrating enablement and execution of a diagnostics routine for an exhaust catalyst (such as emissions control device 70 in FIGS. 1-2). The horizontal (x-axis) denotes time and the vertical markers t1-t3 identify significant times in the routine for enablement and diagnostics of the catalyst.

The first plot, line 602, shows a change in engine speed over time as estimated based on inputs from a crankshaft position sensor. The second plot, line 604, shows a variation in temperature of a heated exhaust gas oxygen (such as HEGO sensor 129 in FIG. 2) sensor coupled to the exhaust passage downstream of the exhaust catalyst based on inputs from an exhaust temperature sensor. Dashed line 605 denotes a threshold HEGO temperature below which engine's inner air-fuel ratio control loop may not be activated and catalyst diagnostics may not be carried out. The third plot, line 606, denotes a counter for the number of times the HEGO sensor records a voltage corresponding to a stoichiometric air fuel ratio (crossing stoichiometry). The counter may be incremented by one each time the HEGO sensor reading crosses stoichiometry. The fourth plot, line 608, shows execution of catalyst diagnostics. The fifth plot, line 610, shows a catalyst transfer function. The catalyst transfer function may be determined within a specified frequency range based on an output of the HEGO sensor and/or an output of an oxygen sensor coupled to the exhaust passage upstream of the catalyst. Dashed line 611 denotes a threshold catalyst transfer function below which the catalyst may be indicated as non-degraded. The sixth plot, line 612, denotes a flag indicating degradation of the exhaust catalyst.

Prior to time t1, the engine is not operated and the vehicle is not propelled via engine torque. At time t1, the engine is started from rest by combusting fuel and air in the engine cylinders and the engine speed gradually increases. At engine start, the HEGO temperature is below the threshold temperature. The stoichiometric crossings of the HEGO sensor is recorded in the counter and the catalyst diagnostics is disabled during this time. Due to the catalyst not being indicated as degraded, the flag may be maintained in the off condition. The time duration between time t1 and t2 may constitute a threshold time for monitoring the number of stoichiometric crossings for the HEGO sensor.

At time t2, in response to the number of stoichiometric crossings of the HEGO sensor (as indicated by the counter) being higher than the threshold 607 and the HEGO temperature being higher than the threshold temperature 605, catalyst diagnostics may be initiated. Between time t2 and t3, during the diagnostics, catalyst transfer function may be estimated and compared to the threshold 611. Upon completion of the catalyst diagnostics at time t3, it is indicated that the catalyst transfer function remains below the threshold 611. Therefore, it is confirmed that the catalyst is not degraded and the flag is maintained in the off position.

In this way, by enabling catalyst diagnostics even when the HEGO sensor output is outside a desired range, a completion rate of the diagnostic routine may be increased and a degradation of the catalyst may be detected earlier and suitable mitigating actions may be undertaken.

In one example, a method for an engine, comprises: monitoring health of a catalyst coupled to an exhaust passage based on inputs from an oxygen sensor coupled in the exhaust passage downstream of the catalyst upon fulfilment of diagnostic entry conditions including each of an output voltage of the oxygen sensor being within a threshold range, and the oxygen sensor recording a stoichiometric air-fuel ratio higher than a threshold number of times within a threshold duration, without requiring both occur concurrently. In the preceding example, additionally or optionally, the diagnostic entry conditions further include a first rate of stoichiometric crossing of the oxygen sensor being higher than a threshold rate, wherein a stoichiometric crossing corresponds to the oxygen sensor recording the stoichiometric air-fuel ratio. In any or all of the preceding examples, additionally or optionally, the diagnostic entry conditions further include the first rate of the stoichiometric crossing of the oxygen sensor being substantially equal to a second rate of stoichiometric crossings of an output of another oxygen sensor coupled in the exhaust passage upstream of the catalyst. In any or all of the preceding examples, additionally or optionally, recording the stoichiometric air-fuel ratio includes recording an output voltage value of the oxygen sensor corresponding to the stoichiometric air-fuel ratio. In any or all of the preceding examples, additionally or optionally, the threshold range includes an output voltage range of the oxygen sensor between an upper voltage limit and a lower voltage limit. In any or all of the preceding examples, additionally or optionally, the oxygen sensor is a heated exhaust gas oxygen (HEGO) sensor. In any or all of the preceding examples, additionally or optionally, the diagnostic entry conditions further include a temperature of the catalyst being higher than a light-off temperature of the catalyst. In any or all of the preceding examples, additionally or optionally, monitoring the health of the catalyst includes indicating degradation of the catalyst in response to a catalyst transfer function determined within a specified frequency range based on an output of the oxygen sensor. In any or all of the preceding examples, additionally or optionally, the degradation is based on a gain of the catalyst transfer function within the specified frequency range being above a threshold. In any or all of the preceding examples, the method further comprising, additionally or optionally, in response to indication of degradation, adjusting engine fuel injectors to reduce an amplitude of a square wave air-fuel ratio provided to the catalyst. In any or all of the preceding examples, additionally or optionally, the catalyst is a three-way catalyst storing and releasing oxygen.

Another example method for an engine comprises: in response to an output of a downstream exhaust gas sensor coupled to an exhaust passage downstream of an exhaust catalyst being outside a threshold range, estimating a number of stoichiometric crossings of the output of the downstream exhaust gas sensor within a threshold duration, and conducting a diagnostic of the exhaust catalyst in response to the number of stoichiometric crossings being higher than a threshold. In any or all of the preceding examples, additionally or optionally, the number of stoichiometric crossings is a number of times an output voltage of the downstream exhaust gas sensor is at a desired voltage corresponding to a stoichiometric air-fuel ratio. In any or all of the preceding examples, the method further comprising, additionally or optionally, conducting the diagnostic of the exhaust catalyst in response to a rate of stoichiometric crossings of the output of the downstream exhaust gas sensor being higher than a threshold, where the rate of stoichiometric crossings of the output of the downstream exhaust gas sensor is estimated over a threshold duration. In any or all of the preceding examples, the method further comprising, additionally or optionally, estimating a rate of stoichiometric crossings of an output of an upstream exhaust gas sensor coupled to the exhaust passage upstream of the exhaust catalyst over the threshold duration, and conducting the diagnostic of the exhaust catalyst in response to the rate of stoichiometric crossings of the output of the downstream exhaust gas sensor being substantially equal to the rate of stoichiometric crossings of the output of the upstream exhaust gas sensor. In any or all of the preceding examples, additionally or optionally, the diagnostic of the exhaust catalyst is based on a comparison between the output of the upstream exhaust gas sensor and the output of the downstream exhaust gas sensor during a closed loop engine operation. In any or all of the preceding examples, additionally or optionally, the upstream exhaust gas sensor is a universal exhaust gas oxygen sensor and the downstream exhaust gas sensor is a heated exhaust gas oxygen sensor.

In yet another example, a system for an engine, comprises: a controller with computer readable instructions stored on non-transitory memory that, when executed, cause the controller to: estimate a voltage output of an exhaust gas sensor coupled to an exhaust passage downstream of a three-way catalyst over a time duration, estimate a number of times the voltage output corresponds to a stoichiometric air-fuel ratio over the time duration, and in response to the number of times being higher than a threshold number, independent of a current output of the exhaust gas sensor, carry out diagnostics of the three-way catalyst. In the preceding example system, additionally or optionally, the diagnostics of the three-way catalyst include, indicating degradation of the three-way catalyst in response to a gain of a catalyst transfer function determined within a specified frequency range based on the voltage output of the exhaust gas sensor being above a threshold. In any or all of the preceding examples, additionally or optionally, the diagnostics of the three-way catalyst are carried out after a light-off temperature of the three-way catalyst is reached and upon activation of each of an inner air-fuel ratio control loop and an outer air-fuel ratio control loop.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
monitoring health of a catalyst coupled to an exhaust passage based on inputs from an oxygen sensor coupled in the exhaust passage downstream of the catalyst upon fulfilment of diagnostic entry conditions including each of an output voltage of the oxygen sensor being within a threshold range, and the oxygen sensor recording a stoichiometric air-fuel ratio higher than a threshold number of times within a threshold duration, without requiring both to occur concurrently.

2. The method of claim 1, wherein the diagnostic entry conditions further include a first rate of stoichiometric crossing of the oxygen sensor being higher than a threshold rate, wherein a stoichiometric crossing corresponds to the oxygen sensor recording the stoichiometric air-fuel ratio.

3. The method of claim 2, wherein the diagnostic entry conditions further include the first rate of the stoichiometric crossing of the oxygen sensor being substantially equal to a second rate of stoichiometric crossings of an output of another oxygen sensor coupled in the exhaust passage upstream of the catalyst.

4. The method of claim 1, wherein recording the stoichiometric air-fuel ratio includes recording an output voltage value of the oxygen sensor corresponding to the stoichiometric air-fuel ratio.

5. The method of claim 1, wherein the threshold range includes an output voltage range of the oxygen sensor between an upper voltage limit and a lower voltage limit.

6. The method of claim 1, wherein the oxygen sensor is a heated exhaust gas oxygen (HEGO) sensor.

7. The method of claim 1, wherein the diagnostic entry conditions further include a temperature of the catalyst being higher than a light-off temperature of the catalyst.

8. The method of claim 1, wherein monitoring the health of the catalyst includes indicating degradation of the catalyst in response to a catalyst transfer function determined within a specified frequency range based on an output of the oxygen sensor.

9. The method of claim 8, wherein the degradation is based on a gain of the catalyst transfer function within the specified frequency range being above a threshold.

10. The method of claim 8, further comprising, in response to indication of degradation, adjusting engine fuel injectors to reduce an amplitude of a square wave air-fuel ratio provided to the catalyst.

11. The method of claim 1, wherein the catalyst is a three-way catalyst storing and releasing oxygen.

12. A method for an engine, comprising:
in response to an output of a downstream exhaust gas sensor coupled to an exhaust passage downstream of an exhaust catalyst being outside a threshold range,
estimating a number of stoichiometric crossings of the output of the downstream exhaust gas sensor within a threshold duration; and
conducting a diagnostic of the exhaust catalyst in response to the number of stoichiometric crossings being higher than a threshold.

13. The method of claim 12, wherein the number of stoichiometric crossings is a number of times an output voltage of the downstream exhaust gas sensor is at a desired voltage corresponding to a stoichiometric air-fuel ratio.

14. The method of claim 12, further comprising conducting the diagnostic of the exhaust catalyst in response to a rate of stoichiometric crossings of the output of the downstream exhaust gas sensor being higher than a threshold, where the rate of stoichiometric crossings of the output of the downstream exhaust gas sensor is estimated over a threshold duration.

15. The method of claim 14, further comprising estimating a rate of stoichiometric crossings of an output of an upstream exhaust gas sensor coupled to the exhaust passage upstream of the exhaust catalyst over the threshold duration, and conducting the diagnostic of the exhaust catalyst in response to the rate of stoichiometric crossings of the output of the downstream exhaust gas sensor being substantially equal to the rate of stoichiometric crossings of the output of the upstream exhaust gas sensor.

16. The method of claim 15, wherein the diagnostic of the exhaust catalyst is based on a comparison between the output of the upstream exhaust gas sensor and the output of the downstream exhaust gas sensor during a closed loop engine operation.

17. The method of claim 15, wherein the upstream exhaust gas sensor is a universal exhaust gas oxygen sensor and the downstream exhaust gas sensor is a heated exhaust gas oxygen sensor.

18. A system for an engine, comprising:
a controller with computer readable instructions stored on non-transitory memory that, when executed, cause the controller to:
estimate a voltage output of an exhaust gas sensor coupled to an exhaust passage downstream of a three-way catalyst over a time duration;
estimate a number of times the voltage output corresponds to a stoichiometric air-fuel ratio over the time duration; and in response to the number of times being higher than a threshold number, independent of a current output of the exhaust gas sensor, carry out diagnostics of the three-way catalyst.

19. The system of claim 18, wherein the diagnostics of the three-way catalyst include, indicating degradation of the three-way catalyst in response to a gain of a catalyst transfer function determined within a specified frequency range based on the voltage output of the exhaust gas sensor being above a threshold.

20. The system of claim 18, wherein the diagnostics of the three-way catalyst are carried out after a light-off temperature of the three-way catalyst is reached and upon activation of each of an inner air-fuel ratio control loop and an outer air-fuel ratio control loop.

* * * * *